United States Patent [19]

Saleh et al.

[11] Patent Number: 5,048,057
[45] Date of Patent: Sep. 10, 1991

[54] WIRELESS LOCAL AREA NETWORK

[75] Inventors: Adel A. M. Saleh, Holmdel; Lee-Fang Wei, Lincroft, both of N.J.

[73] Assignee: AT&T Bell Laboratories, Murray Hill, N.J.

[21] Appl. No.: 459,880

[22] Filed: Jan. 2, 1990

[51] Int. Cl.[5] .......................... H04B 7/02; H04L 1/02
[52] U.S. Cl. ...................................... 375/40; 375/58; 375/99; 455/60
[58] Field of Search .................... 375/40, 39.1, 99, 58, 375/60, 100, 26, 57; 455/60, 152, 132, 296; 380/33, 34; 371/43, 37.1, 37.7; 370/20, 2

[56] References Cited

U.S. PATENT DOCUMENTS

| 3,423,729 | 1/1969 | Heller | 375/40 X |
| 3,605,019 | 9/1971 | Cutter et al. | 375/58 X |
| 4,881,241 | 11/1989 | Pommier et al. | 375/58 X |

Primary Examiner—Benedict V. Safourek
Assistant Examiner—Tesfaldet Bocure
Attorney, Agent, or Firm—Ronald D. Slusky

[57] ABSTRACT

In a wireless local area network, predetermined interference-detection sequences of signal points, known at both the transmitter and receiver, are transmitted over a plurality of hopping frequencies along with a sequence of data signal points taken from a modulated code exhibiting built-in diversity. In the receiver, the extent to which there are errors in the received interference-detection signal points is used as a mechanism for identifying the likely occurrence of strong interference. If there are no, or few, errors, decoding proceeds normally. However, if the number of errors is above a predetermined threshold, it is assumed that the transmitted signal was subjected to significant interference and an erasure is declared. This is used as "side" information by the decoder to improve its ability to accurately recover data in the presence of interference.

14 Claims, 7 Drawing Sheets

FIG. 10

| INPUT BIT PATTERN | 4D-SUBSET PAIR |
|---|---|
| 0 0 | $(S_0, S_0)$ |
| 0 1 | $(S_1, S_2)$ |
| 1 0 | $(S_2, S_1)$ |
| 1 1 | $(S_3, S_3)$ |

FIG. 11

| INPUT BIT PATTERN | CODEWORD |
|---|---|
| 0 0 0 0 | 0 0 0 0 |
| 0 0 0 1 | 0 1 2 3 |
| 0 0 1 1 | 0 2 3 1 |
| 0 0 1 0 | 0 3 1 2 |
| 0 1 1 1 | 1 0 3 2 |
| 0 1 1 0 | 1 1 1 1 |
| 0 1 0 0 | 1 2 0 3 |
| 0 1 0 1 | 1 3 2 0 |
| 1 1 0 0 | 2 0 1 3 |
| 1 1 0 1 | 2 1 3 0 |
| 1 1 1 1 | 2 2 2 2 |
| 1 1 1 0 | 2 3 0 1 |
| 1 0 1 1 | 3 0 2 1 |
| 1 0 1 0 | 3 1 0 2 |
| 1 0 0 0 | 3 2 1 0 |
| 1 0 0 1 | 3 3 3 3 |

WIRELESS LOCAL AREA NETWORK

BACKGROUND OF THE INVENTION

The present invention relates to local area networks (LANs) and, more particularly, to wireless LANs.

For a number of years, engineers have been investigating the possibility of having a LAN based on other than hard-wired transmission between the stations. Certain proposed systems have been based on the use of infrared transmission. Although useful in some applications, the communicating stations need to be within line-of-sight of each other, which may be disadvantageous in other applications. Accordingly, it has also been proposed to use radio transmission in such systems. Here, line-of-sight is not required. However, unlike the infrared case, multipath fading (hereinafter "fading") is a significant transmission impairment, particularly in indoor environments. Another significant problem is possible interference from other radio systems operating in the same frequency bands. These impairments can result in the loss of the transmitted information and, hereinafter, the word "loss" is used to refer to such information loss, whether arising from fading, interference or some combination of both.

Various techniques have been proposed to counter the fading and interference problems. For example, antenna diversity has been proposed to counteract fading. In addition, to counter both fading and interference, the use of direct sequence spread spectrum transmission or frequency hopping—possibly combined with some form of conventional channel coding—has been proposed. The present invention relates to the latter approach, which is described, for example, in A. A. M. Saleh and L. J. Cimini, Jr., "Indoor Radio Communications Using Time-Division Multiple Access with Cyclical Slow Frequency Hopping and Coding," *IEEE Journal on Selected Areas in Communications*, Vol. 7, No. 1, January 1989, pages 59-70, and in A. A. M. Saleh et al., "A TDMA Indoor Radio Communications System Using Cyclical Slow Frequency Hopping and Coding—Experimental Results and Implementation Issues," *Conference Record of the IEEE Global Telecommunications Conference & Exhibition*, Volume 3, November 28-Dec. 1, 1988, pages 1337-1342.

In particular, frequency hopping is a technique in which the information to be communicated is transmitted over a sequence of predefined "hopping" frequencies in a predefined order. The underlying theory of this approach is that loss and fading are not likely to occur over all frequencies at the same time. Thus, by "hopping" over several frequencies, at least some of the information will arrive at its intended destination intact. Advantageously, channel coding may be used in conjunction with the frequency hopping in such a way that the lost information can be recovered with high probability. Specifically, the information is encoded into a sequence of codewords, each codeword being made up of a sequence of signal points. Typically, the number of signal points in each codeword is the same as the number of hopping frequencies, and the signal points are rearranged for transmission in such a way that each signal point from each codeword is transmitted on a respective different hopping frequency. Thus even if certain of the signal points are lost, the inherent redundancy in the coding is such that, as noted above, the lost information can be recovered with high probability. In preferred systems embodying this approach, as described in the above-cited Saleh/Cimini paper, an interleaving approach may be used in which data signal points from a number of sequential codewords are transmitted on a single hopping frequency before transmission proceeds to the next hopping frequency. This advantageously reduces the rate at which the system needs to switch from one hopping frequency to another.

SUMMARY OF THE INVENTION

The present invention is directed to a frequency hopping transmission technique which is particularly useful in environments in which strong interference is expected, such as the so-called ISM band allocated by the United States Federal Communications Commission. In accordance with the invention, we have found that the combination of the use of a technique for detecting strong inteference in conjunction with a) coded modulation with built-in diversity of the type disclosed in the commonly-assigned, copending U.S. patent application, Ser. No. 386,185 filed by L. Wei on July 28, 1989 and entitled "Coded Modulation for Mobile Radio," and b) soft decision decoding can, indeed, provide a system which combats both fading and strong interference to an extent not achieved heretofore. In particular, the diversity-coded modulation provides protection against fading. However, the effectiveness of coding techniques is reduced in the presence of strong interference. Advantageously, however, the interference detection technique provides the needed inteference immunity and thereby overcomes this limitation of the codes themselves.

Generally speaking, the preferred approach to detecting the likelihood of strong interference is to transmit the modulated signal in such a way that the interference will cause the received signal to have a particular characteristic which can be detected. More particularly, in preferred embodiments a predetermined interference-detection sequence of signal points known at both the transmitter and receiver is transmitted along with the sequence of diversity-coded data signal points over each hopping frequency, and the error rate of the received inteference-detection signal points is the aforementioned particular characteristic. If the number of such errors is below a certain threshold, no strong interference has occurred and decoding proceeds normally. On the other hand, if the interference-detection signal points are substantially in error, strong interference is assumed to have occurred. In that case, the decoding process itself proceeds normally but the values of the received signal points as applied to the decoder are set to zero (or, equivalently, are simply ignored).

Various features of the invention are specifically pointed to hereinbelow.

BRIEF DESCRIPTION OF THE DRAWING

In the drawing,

FIGS. 9-11 graphically depict these codes.

DETAILED DESCRIPTION

Figure 1:
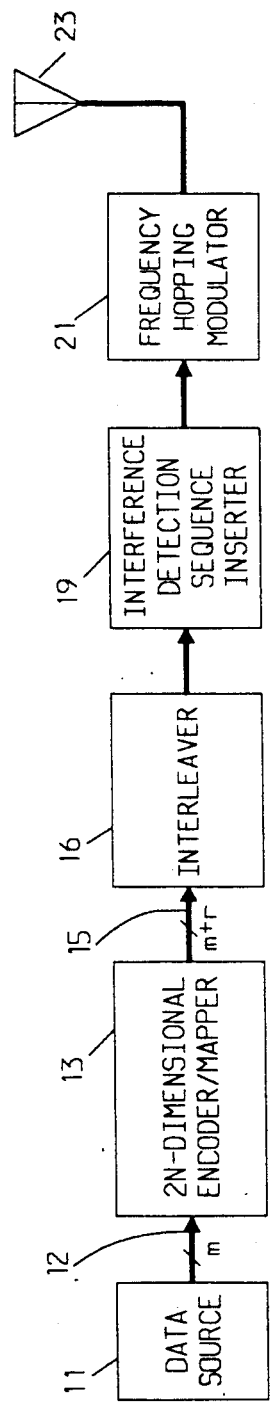
FIG. 1 is a block diagram of a transmitter embodying the principles of the invention.

FIG. 1 is a block diagram of a transmitter embodying the principles of the invention. The transmitter is illustratively a part of a wireless local area network (LAN) which can be used, for example, to interconnect a collection of terminals, such as PCs, printers, file servers and the like, which are located within a localized environment, such as an office building. Alternatively, the LAN could be used as the interconnection mechanism for a wireless communication system, such as a PBX. Radio signals generated by the transmitter are received by a receiver, shown in FIG. 2, which is within the geographical area covered by the LAN.

In the transmitter of FIG. 1, data from a binary data source 11 is applied to 2N-dimensional block encoder/mapper 13 at a rate of m bits per T-second signalling interval. Block encoder/mapper 13 accumulates a block of input data comprised of N signalling intervals' worth of bits and then uses a particular 2N-dimensional block code to encode the accumulated N×m bits into N groups of (m+r) encoded bits, those groups being provided successively on leads 15. Here, the parameter r is the average number of redundant bits per signalling interval introduced by the block encoder/mapper 13. Each allowed bit pattern of the (m+r)-bit group is associated with a particular signal point of a two-dimensional (2D) $M(\leq 2^{m+r})$-PSK constellation. The block code is referred to as being "2N-dimensional" because each signal point has 2 dimensions and each "codeword" output by the block encoder/mapper 13 is represented by N signal points.

Figure 7:
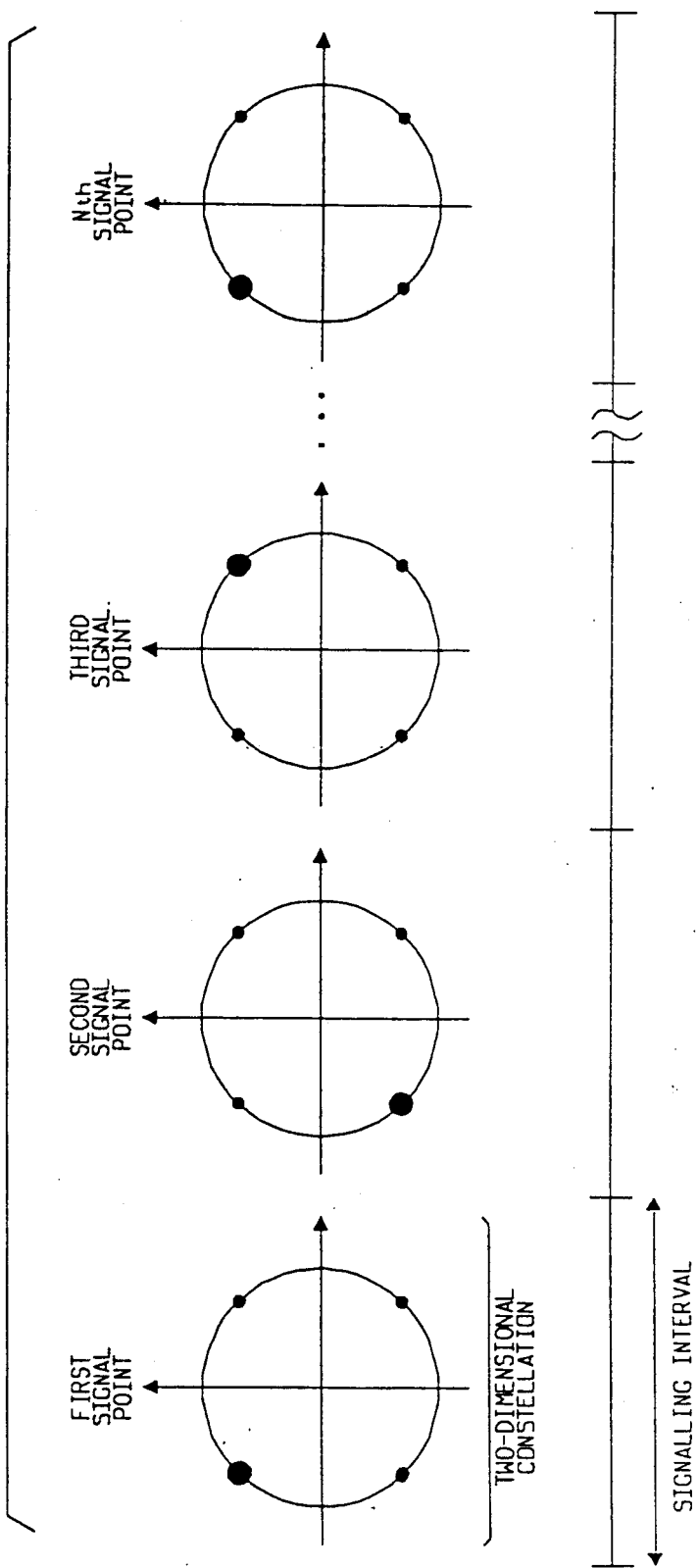
FIG. 7 is a chart which helps explain certain terminology and concepts.

Attention is directed briefly to FIG. 7 which will be helpful in understanding certain of the terminology and concepts used herein. The 2N-dimensional block encoder/mapper generates 2N-dimensional "codewords". Each codeword is comprised of a block of N coded modulation "signal points". Each signal point is a point in a predetermined two-dimensional "constellation"—illustratively shown in FIG. 7 as a phase shift keying constellation having four signal points, or 4-PSK. This 2N-dimensional codeword is delivered during N "signalling intervals," one signal point in each signalling interval. The assemblage of all 2N-dimensional codewords is referred to as the "2N-dimensional constellation," with each codeword being an "element" of the 2N-dimensional constellation. The 2N-dimensional constellation is also referred to as a codebook or as an alphabet.

The code is constructed in such a way, as described below, as to have so-called built-in diversity. As described below, this diversity is exploited by the use of frequency hopping transmission in which at least particular signal points of a codeword--those which exhibit the diversity--are transmitted using different transmission frequencies. These frequencies are sufficiently spaced apart to ensure that they fade independently, thereby taking advantage of the diversity built into the code.

The signal points output by encoder/mapper 13 are thereafter rearranged by interleaver 16 in order to reduce the rate at which the system needs to switch from one hopping frequency to another, as will also be further described.

The interleaved signal points are thereupon operated on by interference-detection-sequence inserter 19 which, as its name implies, combines a predetermined sequence of interference-detection signal points with the interleaved data signal points in a deterministic way. This sequence of interference-detection signal points is used later, in the receiver, to identify the likely occurrence of interference whose strength is comparable to, or even stronger than, the transmitted signal. The resulting combined signal point stream at the output of inserter 19 is then passed to frequency hopping modulator 21, which modulates the signal points—illustratively using M-ary PSK--and applies the resulting radio signal to antenna 23.

Figure 3:
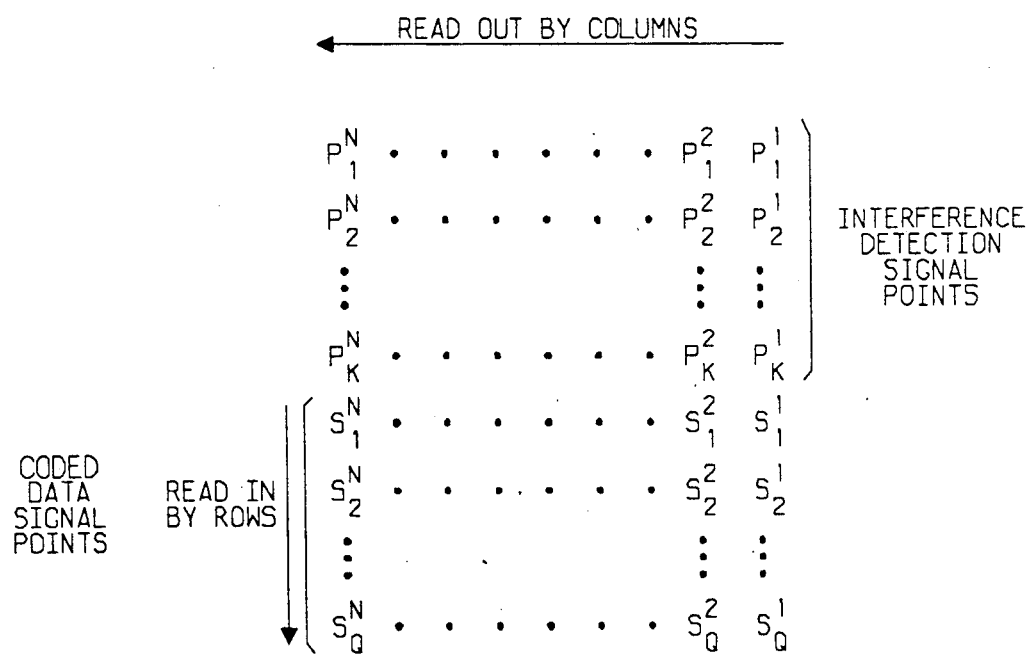
FIG. 3 depicts one way of interleaving coded data signal points and combining them with interference-detection signal points in accordance with the invention.

FIG. 3 shows one possible way in which the coded data signal points are interleaved and the interference-detection sequence is combined therewith. The N signal points of the $i^{th}$ codeword are denoted $S_i^1, S_i^2, \ldots, S_i^N$. Q such codewords are read into interleaver 16 and may be thought of as being stored in rows. In addition, inserter 19 has stored therein N interference-detection sequences of K signal points each, the $j^{th}$ one of these being denoted $P_1^j, P_2^j, \ldots, P_K^j$, j=1, 2, ..., N. Each of the N interference-detection sequences may be identical to one another. Illustratively, N=8. Q is illustratively on the order of a few hundreds and K is on the order of 10-30.

Figure 5:
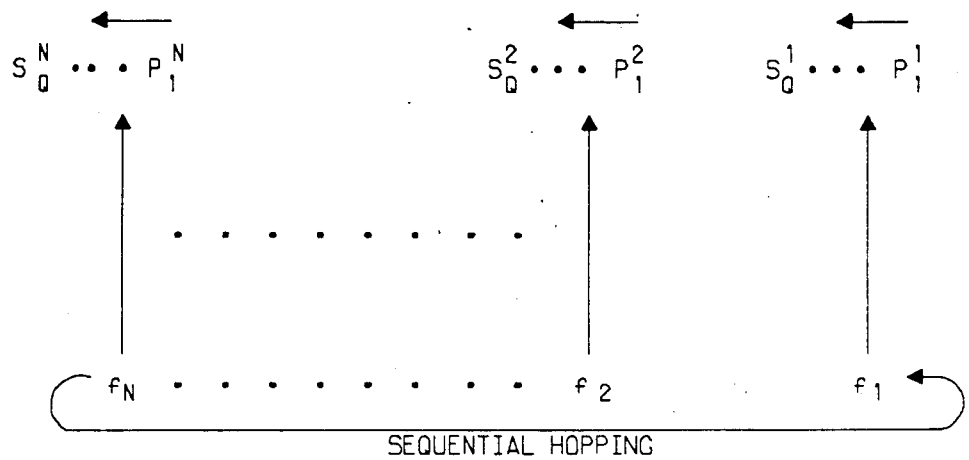
FIG. 5 depicts the sequential frequency hopping performed by the transmitter of FIG. 1.

Inserter 19 operates in such a way as to provide to modulator 21 a first sequence comprised of interference-detection signal points and coded data signal points to be transmitted using frequency $f_1$, another such sequence to be transmitted using frequency $f_2$, and so forth for each of the N frequencies. This process may be conceptualized, as shown in FIG. 3, as reading out the columns of signal points and transmitting the signal points from each column using a respective frequency. Thus, for example, inserter 19 outputs to modulator 21, for transmission using frequency $f_1$, the sequence of K interference-detection signal points, $P_1^1, P_2^1, \ldots, P_K^1$. It thereafter reads in from interleaver 16—and passes through to modulator 21—the Q coded data signal points $S_1^1, S_2^1, \ldots, S_Q^1$. It then repeats the process for each of the other N-1 frequencies and then begins again for frequency $f_1$. In this way, there is transmitted on each of the hopping frequencies a) a premeable sequence of K interference-detection signal points and b) a sequence of Q coded data signal points each from a different codeword. This is graphically depicted in FIG. 5, which shows that the transmitter hops sequentially among the N hopping frequencies and further shows the interference-detection and coded data signal points transmitted using each frequency.

Although the interference-detection signal points can be included in the transmitted signal point stream in the form of a preamble as just described, it is preferred, in accordance with a feature of the invention, to distribute the interference-detection signal points among the coded data signal points transmitted on each frequency so that they are transmitted non-time-contiguously.

This distributed approach provides improved performance over the preamble approach, as will be described in further detail hereinbelow.

Figure 4:
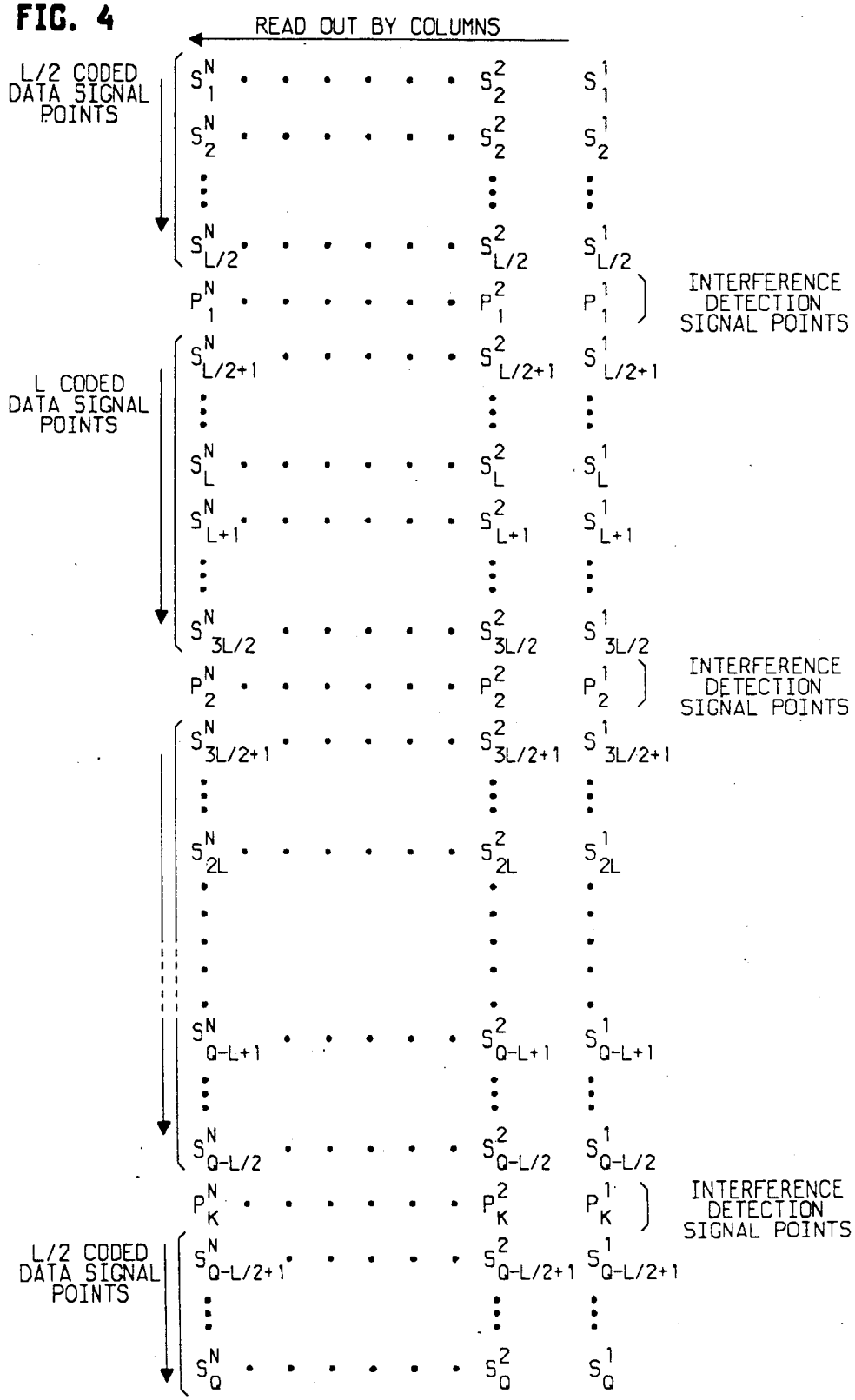
FIG. 4 depicts a second way of interleaving coded data signal points and combining them with interference-detection signal points in accordance with the invention.

A conceptual view of the distributed approach is provided in FIG. 4. As before, the codewords can be thought of as being read into the interleaver and stored therein in rows. Now, however, the K rows of interference-detection signal points are interspersed among the Q rows of data signal points, rather than being grouped together as in FIG. 3. Illustratively, a row of interference-detection signal points is inserted in the middle of each group of $L=Q/K$ data signal point rows. Thus the sequence of signal points transmitted on each frequency is comprised of K groups, each group being comprised of L/2 coded data signal points, one interference-detection signal point, and then another L/2 coded data signal points.

Figure 2:
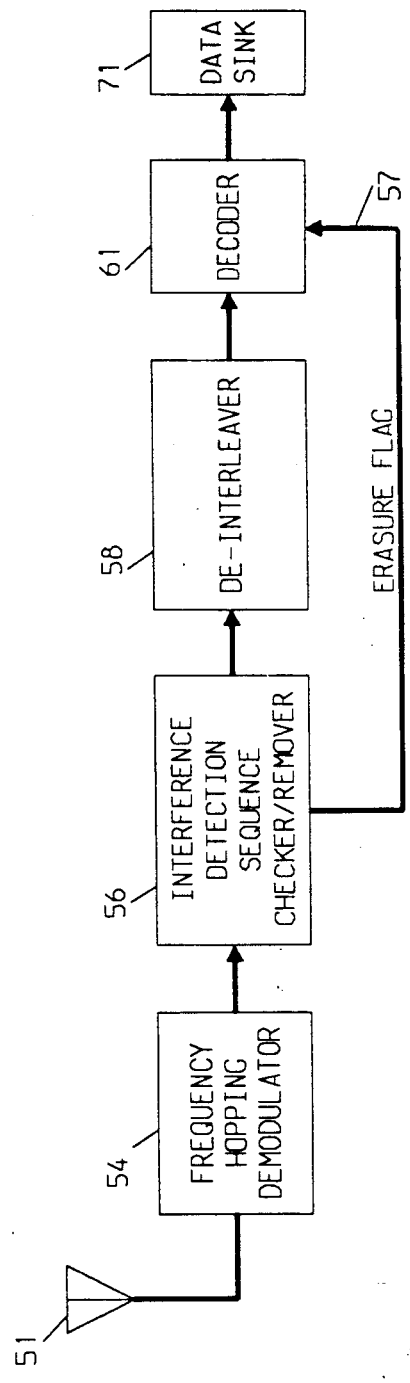
FIG. 2 is a block diagram of a receiver embodying the principles of the invention.

Turning now to the receiver of FIG. 2, the transmitted signal, received at antenna 51, is applied to frequency hopping demodulator 54, which hops in synchronism with modulator 21. Demodulator 54 generates a stream of noisy received signal points corresponding to the transmitted signal points output by inserter 19. This stream of received signal points is passed to interference-detection sequence checker/remover 56, which makes a so-called "hard" decision for each received interference-detection signal point, i.e., chooses the point of the M-PSK constellation that is closest to the received point and compares it to the transmitted such signal point which is known, a priori, at the receiver. The number of interference-detection signal points in error is counted for each sequence and the count is used as a mechanism for identifying signal points that are likely to have been subject to strong interference. If the number of errors is above a predetermined threshold, it is assumed that the transmitted signal was subjected to strong interference and, in this case, the occurrence of strong interference is declared by raising an erasure flag on lead 57—that flag to be used by decoder 61 as hereinafter described. If the number of errors is not above the predetermined threshold, no strong interference is assumed to have occurred and the erasure flag is not raised. In summary, then, the erasure flag is a signal indicative of the presence of strong interference in the block of coded modulation signal points transmitted over a given frequency, which signal is generated as a function of the error rate of the associated received interference-detection signal points.

The principal reason for preferably distributing the interference-detection signal points among the coded data signal points transmitted on each frequency can now be understood. If the preamble approach were to be used, and if an interference event were to occur after the preamble had been transmitted, the erasure flag would not be raised, even though an interference event affecting the coded data signal points had occurred. By contrast, the distributed approach allows the receiver to raise the erasure flag at any point during the signal point sequence received at a given frequency—thereby enhancing the performance of the technique as a whole.

Checker/remover 56 thereupon removes the information corresponding to the interference-detection signal points and passes the remaining part—corresponding to the coded data signal points—to de-interleaver 58. The latter performs the inverse operation of interleaver 16 so as to deliver to decoder 61 the signal points corresponding to the transmitted coded data signal points in the order in which those signal points were generated by encoder 13, i.e., in sequences of N-signal-point codewords. Decoder 61, in turn, attempts to recover the original binary data provided by data source 11, which it provides to data sink 71.

Figure 6:
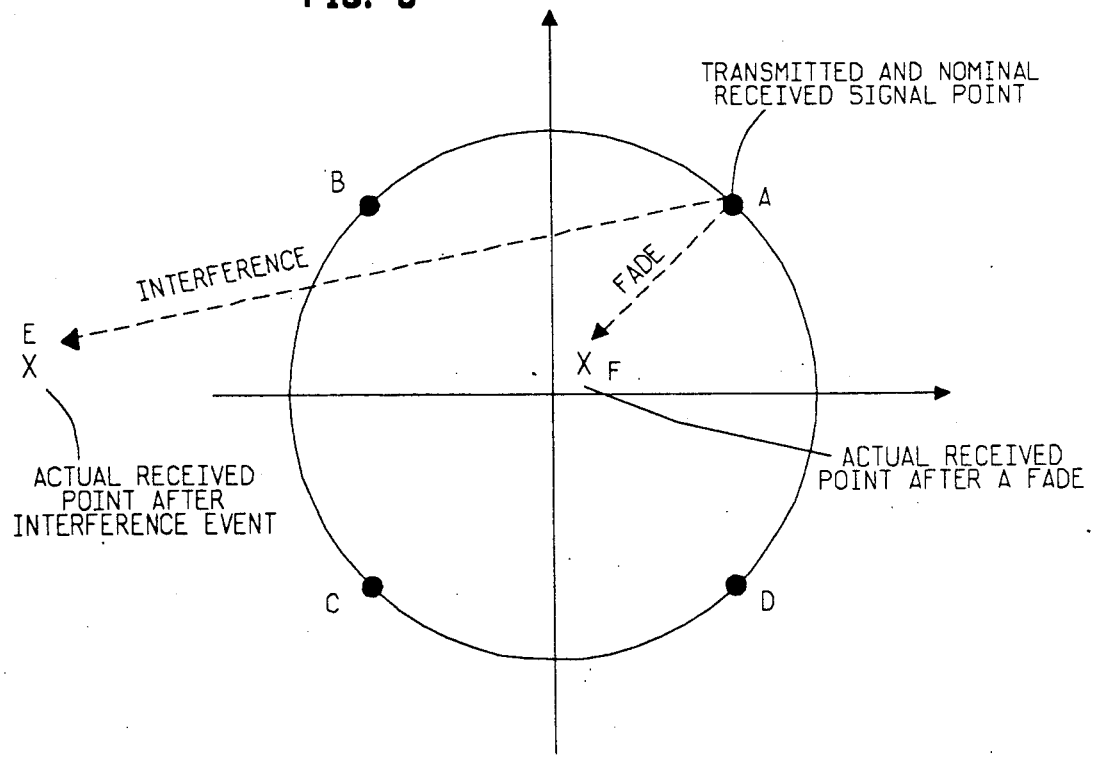
FIG. 6 illustrates the effects of fading and interference on the signal points transmitted by the transmitter of FIG. 1.

As noted above, a decoder used in a diversity coded modulation system—in this example, decoder 61—can exhibit better error performance in the presence of strong interference if it is made aware of the occurrence of that interference—in this example, via the erasure flag on lead 57. This can be understood by referring to FIG. 6. A 4-level, PSK (4-PSK) modulation scheme is assumed in which the nominal received signal points are the points A, B, C and D. Assume, now, that point A was transmitted but that, due to a fade in the transmission channel, the received signal is attenuated so that the received point is point F. Note that although the amplitude of the signal point is substantially reduced, the phase information has not been affected. This being so, it is advantageous to use the position of point F as input to the decoding process because there is still some correlation between the signal point positions of the transmitted and received signal points.

On the other hand, assume that due to strong interference in the transmission channel, the received signal point is now the point E, whose position bears little if any information about the transmitted point. In this case, it would be better for the decoder to assume a neutral posture and allow for the possibility that any of the four points A, B, C or D was transmitted, rather than to be biased with wholly erroneous information, which in this case would tend to bias the decoder toward point B.

The erasure flag on lead 57 is generated with just such considerations in mind. Note that as long as a fade is not very deep (i.e., the received signal point is not very close to the origin in FIG. 6) additive noise will not change the complex signal plane quadrant of very many of the transmitted points. Accordingly, checker/remover 56 will make few (hard-decision) interference-detection signal point errors. Thus, as desired, a fade event is not likely to cause the erasure flag to be raised and decoder 61 will proceed to use the actual received signal points in its normal decoding process.

On the other hand, a strong interference event is likely to result in many interference-detection signal point errors in checker/remover 56 and thus, as desired, the erasure flag will be raised. Responsive to the flag, decoder 61 will ignore those signal points received in time proximity to the interference event. That is, it will perform its decisions as to the values of the transmitted coded modulation signal points independently of the received values of those signal points that were subject to the strong interference.

Figure 8:
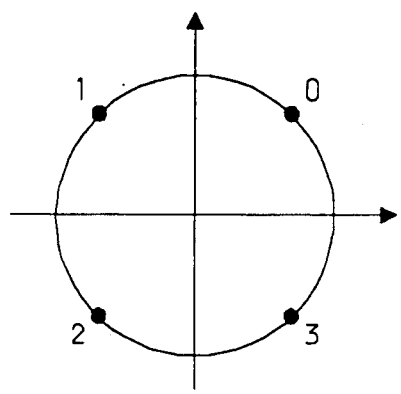
FIG. 8 shows a 4-PSK signal constellation that forms the basis of illustrative modulated codes that can be used to implement the invention.

Various block codes that can be used in the present illustrative embodiment will now be described:

In particular, a 4-PSK signal constellation, as shown in FIG. 8, is illustratively used in implementing a 8-dimensional (8D) code, meaning that each codeword generated by the code is comprised of four 2D points of the 4-PSK constellation. This code is referred to herein as "Code I". Those points are transmitted in respective signalling intervals. The four points of the constellation are labelled 0 through 3. In this case, the parameters m, r and N have values $1\frac{1}{2}$, $\frac{1}{2}$ and 4, respectively. Thus, block encoder/mapper 13 generates a 2-bit pair in each of four successive signalling intervals, each such pair identifying, by its bit values, a particular one of the signal points 0 through 3.

Figure 9:
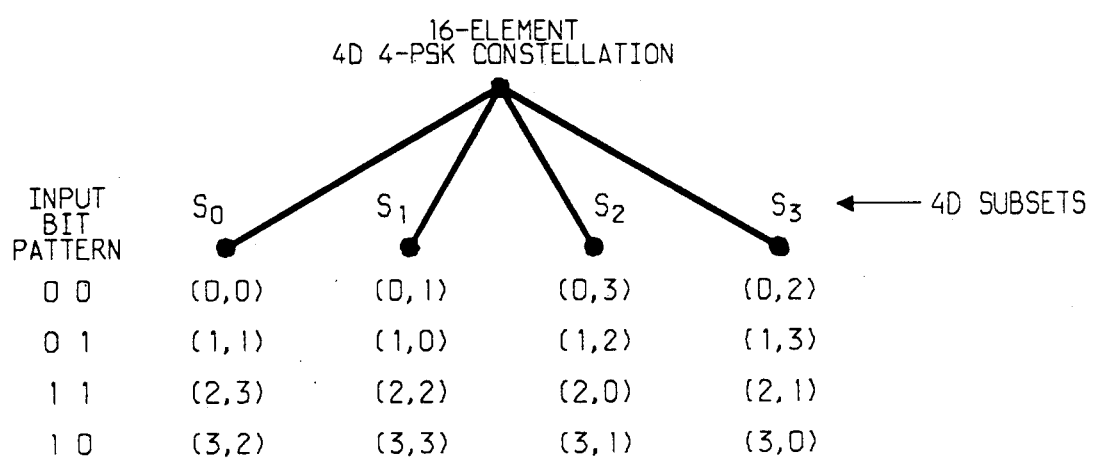

A graphical representation of the code is shown in FIGS. 9 and 10. We start by first defining a constituent 4D 4-PSK constellation which is formed by concatenating a pair of 2D 4-PSK constellations of the type shown in FIG. 8. An 8D constellation is then formed by selecting particular elements from a concatenated pair of the 4D constellations. Each element of the 8D constellation is a sequence of four 2D signal points and is a codeword of the 8D code.

In particular, we select all of the $4 \times 4 = 16$ possible 4D elements for inclusion in the 4D constellation. As shown in FIG. 9, the 16 elements of the 4D constellation are partitioned into four subsets $S_0, \ldots, S_3$.

Finally, we select one-fourth of the $16 \times 16 = 256$ possible 8D elements for inclusion in the 8D constellation. These 256 elements are the elements in the four 4D-subset pairs shown in the table of FIG. 10. Specifically, the concatenation of a particular pair of 4D elements is an element of the 8D constellation if and only if the pair of 4D subsets to which the first and second 4D elements belong respectively is one of the four patterns shown in FIG. 10. Thus, for example, (0,1,1,2) is a codeword of the 8D code because a) (0,1) and (1,2) are elements of 4D subsets $S_1$ and $S_2$, respectively, and b) the pattern ($S_1$, $S_2$) is one of the four allowed patterns of 4D-subset pairs. On the other hand, (0,1,0,1) is not a codeword of the 8D code because a) (0,1) is an element of subset $S_1$ and b) the pattern ($S_1$, $S_1$) is not one of the four allowed patterns of 4D-subset pairs.

Since the 8D code has 64 codewords, this code is capable of communicating six information bits per codeword. In general, any scheme for assigning the bit patterns to particular codewords could be used. FIGS. 9-10 show one possible way in which two of the six bits are first used to select one of four 4D subset pairs from FIG. 10 and then two bits to select one of the four pairs of 2D signal points from one of the selected 4D subsets and likewise for the other selected 4D subset, for a total of six bits overall.

At this point, the built-in diversity of the code can be seen. In particular, it will be observed that each of the 8D codewords differs from any other 8D codewords in at least two signal point positions. Thus, for example, the two 8D codewords (0,1,1,2) and (0,1,2,0) differ in the third and fourth signal point positions. The significance of this property may be understood by considering the case when one of the four constituent signal points is lost in transmission. It is nonetheless possible to recover that information as long as the other three constituent signal points of the 8D codeword have been accurately recovered. In particular, if the fourth signal point of the codeword (0,1,1,2) is lost, then as long as the first three signal points are correctly received, that codeword can nonetheless be determined to have been (0,1,1,2) because no other codeword has 0, 1, and 1 as its first, second and third signal points, respectively. (This analysis is an oversimplification of how the decoding process is preferably carried out, but is useful for purposes of explanation.) Thus it is seen that this code provides built-in enhanced immunity to transmission errors via the mechanism of built-in diversity. That is, information appears redundantly within the coded signal.

In general, a code is said to have X-fold diversity, where X is an integer greater than unity, if each codeword, which is comprised of an ordered sequence of signal points, differs from each other codeword in at least X signal point positions. It will thus be appreciated that the above-described code has 2-fold built-in diversity. Advantageously, the larger the value of X, the greater the so-called coding gain, which is measured by the savings in signal power over an uncoded modulation scheme.

With more specific reference to the system of FIGS. 1-2, then, it will be seen that the signal points which provide the X-fold diversity should be transmitted in at least two—and preferably X—different frequencies which are sufficiently separated that they are likely to fade independently. In the above code, for example, the 2-fold diversity of the code may occur at any pair of signal point positions. That is, for any pair of signal point positions, there exists a pair of codewords which differ in exactly that pair of signal point positions. Thus in order to exploit the 2-fold diversity of this code, the four signal points of a codeword should be transmitted in four independently fading frequencies.

Another parameter that is useful to characterize and compare different codes is referred to herein as the "minimum squared Euclidean distance at X-fold time diversity" or MDX, which is defined as the minimum squared Euclidean distance between any two codewords which differ from each other at exactly X signal point positions. In general, the larger this distance, the greater the coding gain. The MDX of this code is 4—assuming a unity radius for the constellation of FIG. 8.

A number of different 8D codes based on a 4-PSK constellation and having the same 2-fold diversity can alternatively be used in place of Code I. Such codes may be formed by, for example, partitioning the 16-element 4D constellation into various different groups of four subsets; by forming the 8D constellation by choosing various different 4D subset pairs. Any such codes are preferably constructed keeping in mind the desirability of being able to decode them simply using, for example, the soft-decision decoding technique described below.

In particularly hostile signalling environments, 2-fold built-in diversity such as is provided by the code just described may be regarded as inadequate to provide a given level of error performance. In such applications, it may be desirable to enhance the error immunity of the system by using a code with 3-fold, 4-fold, or greater built-in diversity.

An advantageous way to achieve such a code is to build upon the 8D code—specifically by utilizing a 16D code (referred to as Code II)—in which each of the codewords is derived from a respective "base" codeword of the 8D code by simply repeating each signal point of the 8D codeword—referred to herein as "codeword repetition." Thus, for example, one codeword of the 16D code is (0,1,1,2,0,1,1,2) formed by repeating the codeword (0,1,1,2) of the 8D code. It can be shown that this 16D code embodying codeword repetition exhibits 4-fold built-in diversity (X=4) because each pair of 16D codewords differs in at least four signal point positions. For this specific code, $m = \frac{3}{8}$, $r = 1\frac{1}{4}$ and N=8 (and the code rate is $\frac{1}{2}$ that of Code I). In addition, its MDX is 8.

Alternativel, a code embodying codeword repetition can be constructed in which the signal points of the repeated codeword are not exactly the same as the base codeword but, rather, each signal point of the repeated codeword is mapped into a particular other signal point. Thus in the above example, the signal points 0,1,2 and 3 can be mapped into the signal points 0,2,1 and 3, respectively, so that the 16D codeword will be (0,1,1,2,0,2,2,1). An advantage of this approach is that the Euclidean distance between the codewords of the 16D code may be increased over that achieved by strictly repeating the base codeword. An additional alternative way of constructing a codeword repetition code is to concatenate each base codeword with another base codeword in a random fashion. This approach, however will, in general, result in a code that is complex to decode.

This approach is not optimum; from a coding theory standpoint, other 16D codes can be developed which achieve a higher data rate (larger m) and/or better performance (larger X and/or larger MDX). However, such enhancements may come only at the cost of substantially higher system complexity—particularly in the decoder. By contrast, the complexity when the codeword-repeating 16D code is used is only slightly greater than that for the 8D code and thus this approach may be preferred in many applications. (The same considerations also apply to Code IV described below).

Another possible code—referred to as Code III—is that depicted in the table of FIG. 11. This is another 8D code based on the 4-PSK constellation of FIG. 8. This code has $m=1$, $r=1$, $N=4$, exhibits 3-fold diversity ($X=3$), and has an MDX of 8—which is the maximum MDX achievable for a code with these characteristics. This code exhibits greater error immunity than Code I due to its greater degree of diversity and greater MDX, but at a cost of a reduction in the data rate, e.g., two-thirds the rate of Code II.

The code of FIG. 11 is comprised of 16 codewords, which are shown along with the 4-bit input patterns associated therewith. Each codeword is made up of a sequence of four 2D signal points from the 4-PSK constellation, those points, again, being identified as points 0,1,2 and 3.

The 8D code of FIG. 11 was constructed by first constructing the 4D constellation made up of all sixteen possible pairs of the 2D signal points of the 2D constellation of FIG. 8. As before, the 4D constellation is then partitioned into subsets. In this case, there are 16 subsets, each having a single 4D element. Each of those 16 subsets may, therefore, be identified by its 4D element, viz., (0,0), (0,1), ..., (3,3). The 8D constellation is then formed by selecting 16 of the 256 possible 4D subset pairs. Thus, for example, (0,2,3,1) is an 8D codeword formed by concatenating the two 4D subsets (0,2) and (3,1). On the other hand, the 8D element (0,1,3,1)—which is a concatenation of the two 4D subsets (0,1) and (3,1)—is not one of the selected 16 codewords.

As before, a 16D code—referred to as Code IV—can be created from the 8D code of FIG. 11 by repeating the 2D signal points of the 8D codewords to form the 16D codewords. This fourth code has $m=\frac{1}{2}$, $r=1\frac{1}{2}$, $N=8$, exhibits 6-fold diversity ($X=6$), and has an MDX of 16. It is thus the most error-immune of the codes described but also has the lowest bit rate.

We turn, now, to the decoding process performed in decoder 61—illustratively a soft decision decoding process—which can be used for all of the codes described herein.

It is assumed that, prior to performing the steps about to be described, the decoder checks to see if an erasure flag was generated for any of the hopping frequencies. If so, it takes steps to treat signal points received from such erased frequencies as though those signal points were at the origin. The preferred way to do this is to simply ignore the erased signal points when the metrics computations described below are performed.

Consider, first, the case of codes which do not embody codeword repetition, i.e., Codes I and III.

The decoding proceeds by examining each 2D point of a particular received signal corresponding to a transmitted 2N-dimensional codeword. In particular, so-called "2D point metrics" are computed for each received 2D point by measuring the squared Euclidean distance between the received point and all possible transmitted 2D points. In performing this calculation, a particular radius of the received constellation is assumed and the receiver is provided with a gain control (not shown) which is set so as to provide an output constellation whose average radius is at least approximately equal to the radius assumed in the decoding. The performance of the decoder is not sensitive to the exact setting of this received constellation radius. Moreover, in order to de-emphasize the contribution of a faded—and therefore potentially unreliable—received signal point to the decoding process, each of the 2D point metrics may be weighted by a factor proportional to the amplitude of the corresponding received 2D point.

The N 2D received signal points corresponding to the transmitted codeword are sequentially grouped into N/2 4D elements, each of which are then further processed as follows: We find, for each 4D subset (used in the construction of the code as described above), the one 4D element of that subset which is "closest" to the received 4D element being processed. This is achieved by taking each element of the 4D subset in turn and forming the sum of the two 2D point metrics corresponding to that element. The 4D element corresponding to the smallest such sum—referred to below as the "4D subset metric"—is then identified as the "closest" 4D element. The result to this point, then, is the identification, for each of the received 4D elements, of a particular 4D element and its associated 4D subset metric for each 4D subset.

If the code is a 4D code, then there is only one 4D subset. Thus only one 4D element has been identified and that element is taken to be the transmitted codeword. If the code is an 8D or greater code, the above process iterates for each of the received 8D elements.

In particular, the received N/2 4D received elements are sequentially grouped into N/4 8D elements, each of which is then processed in a manner analogous to the 4D case. In particular, we find, for each 8D subset, the one 8D element of that subset which is "closest" to the received 8D element being processed. This is achieved by taking each 4D-subset pair in the 8D subset in turn and forming the sum of the two 4D subset metrics corresponding to that pair. The 8D element in the 4D-subset pair—which is the pair of 4D elements, one element for each 4D subset, obtained from the previous step—corresponding to the smallest such sum—referred to as the "8D subset metric"—is then identified as the "closet" 8D element.

If the code is an 8D code, then a single 8D element has now been identified. Otherwise, the process is again iterated for 16D, and so forth.

The identified codeword is then mapped into data bits based on the bit assignment scheme associated with the code.

The above-described process is based on so-called "soft" decisions. It will be remembered that a so-called "hard" decision approach was used for the interference-detection signal points by processing each received signal point in isolation. In soft decision decoding, by contrast, a decision as to the value of each transmitted signal point is made based on Euclidean distance metrics calculated with respect to not just one but, rather, a plurality of signal points.

Advantageously, the above-described decoding process is implementable in a highly parallel fashion, thereby reducing the time required for decoding which allows for the practical implementation of more complicated—and thus more effective—block-coded schemes and/or higher input data rates. In particular, the 2D point metrics can be calculated for each of the N 2D points of a received 2N-dimensional signal all at the same time, and similarly for the 4D and 8D subset metrics. Moreover, once a number of 2N-dimensional signals are available at the deinterleaver output, each of those signals may be decoded independently of the others in parallel fashion.

Consider, next, the case of codes which do embody codeword repetition, i.e., Codes II and IV. The first step of the decoding process is, for each of the N signal points of a received 2N-dimensional signal, to compute a "preliminary" 2D point metric corresponding to each point of the M-PSK constellation. We then, for each signal point of the M-PSK constellation, combine the corresponding preliminary 2D point metrics for the received signal points that are repetitions of each other. Thus, for example, in the case of Code II, the signal points at the first and fifth signal point positions are repetitions of each other, as will be remembered from the exemplary codeword (0,1,1,2,0,1,1,2). For the first received signal point, we calculate four preliminary 2D point metrics for each of the four signal points 0,1,2 and 3 of the 4-PSK constellation. We do the same thing for the signal point in the fifth signal point position. The two preliminary 2D point metrics corresponding to each constellation signal point are then added together. The resulting sum is a "final" 2D point metric which is then subsequently used as the 2D point metric in the decoding process described above.

The foregoing merely illustrates the principles of the invention. For example, although the invention is described herein principally in the context of wireless LANs, it is equally applicable to other transmission environments in which fading and interference are significant impairments.

Other variations are possible. For example, various values of the parameters N, M, m, r, X, MDX, Q and K can be chosen. It may be noted, however, that in many applications there will be a limit on the number of independently fading hopping frequencies that can be achieved and the value of N should be chosen with this in mind. Moreover, there are a number of implementational advantages to having the value of M be 4, such advantages relating to such transceiver functions as filtering, quantization, decoder complexity, etc. On the other hand, a particular desired value for the bits-per-signal point rate m may be most advantageously achieved by having M>4, e.g., 6 or 8. Moreover, although the invention is illustrated using particular block codes, other codes—including, for example, trellis codes and combined trellis/block codes—can be used. The particular code that is used in a particular application is a function of the particular needs and constraints of that application. Note, specifically, that virtually any level of built-in diversity can be achieved, when desired, by constructing codes embodying three- or more-fold repetition.

In accordance with another variation, space diversity may be added to the system in order to provide even greater performance enhancement. In particular, the receiving station may be provided with two or more receiving antennas. A signal point received from a second antenna can be treated as if it were a repeated signal point in the code and can thus be processed as such. The resulting ensemble of preliminary 2D point metrics—being derived from the multiple antennas and/or actual signal point repetitions—can then all be combined to provide the final 2D point metric.

Alternative techniques for identifying the likely occurrence of strong interference are also possible. One possible such technique—which does not involve the use of interference-detection signal points—might involve an occasional, deliberate erasure, in the transmitter, of the coded data signal points transmitted over a particular hopping frequency. This will not, in general, have a deleterious effect on the error rate of the transmitted data; the built-in diversity of the code will see to that. However, if the receiver detects energy at that frequency at a time when such an erasure has been carried out in the transmitter, it can be assumed in the receiver that such energy was interference-induced. As another possibility, it is conceivable that one skilled in the art might be able to devise a code and/or received coded data signal point monitoring technique capable of performing this identification without anything special being done by the transmitter.

In accordance with another variation, the modulation performed by modulator 21, although disclosed herein as being M-PSK, could alternatively be M-DPSK (i.e., M-ary differential phase shift keying). Indeed, the latter may be the preferred approach when, in a particular application, accurate carrier phase recovery is difficult.

Moreover, although particular circuit structures are shown or implied for various functional elements, such as interleaver 16 and interference-detection sequence inserter 19, these are by way of example only, and various alternative structures for achieving the desired functionalities will be apparent to those skilled in the art. In a particular such alternative structure, the erasure flag provided externally to the decoder as shown in FIG. 2 can be eliminated and the checker/remover, internally responsive to that flag, can reset the affected received signal points to zero.

In this same vein, it will be appreciated that although various discrete circuit elements are shown in the FIGS., the various functions thereof could be equivalently performed by one or more appropriately programmed special- or general-purpose processor.

It will thus be appreciated that various arrangements may be devised by those skilled in the art which, although not explicitly shown or described herein, embody the principles of the invention and are within its spirit and scope.

We claim:
1. Apparatus comprising
   means responsive to a stream of input data for generating a sequence of coded modulation signal points representing that data, said coded modulation signal points being generated from a code having built-in diversity,
   means for transmitting the coded modulation signal points to a receiver, with at least the coded modulation signal points which provide said diversity being transmitted using respective different frequencies,
   means for detecting ones of the coded modulation signal points received by the receiver that are likely to have been subject to strong interference, and means for performing soft decision decoding responsive to the received values of said ones of the coded modulation signal points, other than said detected ones of the coded modulation signal points likely to have been subject to strong interference, to form decisions as to the values of the transmitted coded modulation signal points.

2. The invention of claim 1 wherein said transmitting means is adapted to transmit the coded modulation signal points in such a way that said strong interference will cause the received signal to have a particular characteristic and wherein said detecting means is adapted to detect said particular characteristic.

3. The invention of claim 1 wherein said transmitting means includes means for transmitting a plurality of predetermined interference-detection signal points to the receiver along with said coded modulation signal points.

4. The invention of claim 3 wherein said detecting means includes means for generating a signal indicative of the presence of said strong interference as a function of the error rate of the received interference-detection signal points.

5. The invention of claim 1 wherein said transmitting means transmits, for each of a plurality of blocks of said coded modulation signal points, an associated plurality of interference-detection signal points, the signal points of each said plurality of interference-detection signal points being transmitted non-time-contiguously.

6. The invention of claim 5 wherein said each block of coded modulation signal points and its associated plurality of interference-detection signal points are transmitted through a particular single one of said frequencies.

7. The invention of claim 6 wherein said detecting means includes means for generating a signal indicative of the presence of said strong interference in each said block of coded modulation signal points as a function at the error rate of its associated received interference-detection signal points.

8. A method comprising the steps of generating a sequence of coded modulation signal points representing a stream of input data, said coded modulation signal points being generated from a code having built-in diversity, transmitting the coded modulation signal points to a receiver, with at least the coded modulation signal points which provide said diversity being transmitted using respective different frequencies, detecting ones of the coded modulation signal points received by the receiver that are likely to have been subject to strong interference, and performing soft decision decoding responsive to the received values of said ones of the coded modulation signal points, other than said detected ones of the coded modulation signal points likely to have been subject to strong interference, to form decisions as to the values of the transmitted coded modulation signal points.

9. The invention of claim 8 wherein in said transmitting step the coded modulation signal points are transmitted in such a way that said strong interference will cause the received signal to have a particular characteristic and wherein said detecting step includes the step of detecting said particular characteristic.

10. The invention of claim 8 wherein said transmitting step includes the step of transmitting a plurality of predetermined interference-detection signal points to the receiver along with said coded modulation signal points.

11. The invention of claim 10 wherein said detecting step includes the step of generating a signal indicative of the presence of said strong interference as a function of the error rate of the received interference-detection signal points.

12. The invention of claim 8 wherein in said transmitting step there is transmitted, for each of a plurality of blocks of said coded modulation signal points, an associated plurality of interference-detection signal points, the signal points of each said plurality of interference-detection signal points being transmitted non-time-contiguously.

13. The invention of claim 12 wherein said each block of coded modulation signal points and its associated plurality of interference-detection signal points are transmitted through a particular single one of said frequencies.

14. The invention of claim 13 wherein in said detecting step a signal indicative of the presence of said strong interference in each said block of coded modulation signal points is generated as a function of the error rate of its associated received interference-detection signal points.

* * * * *